Aug. 9, 1955  G. A. MOSBY  2,714,873
COMBINATION LEASH AND PICKET STAKE DOG TRAINING DEVICE
Filed Feb. 6, 1953
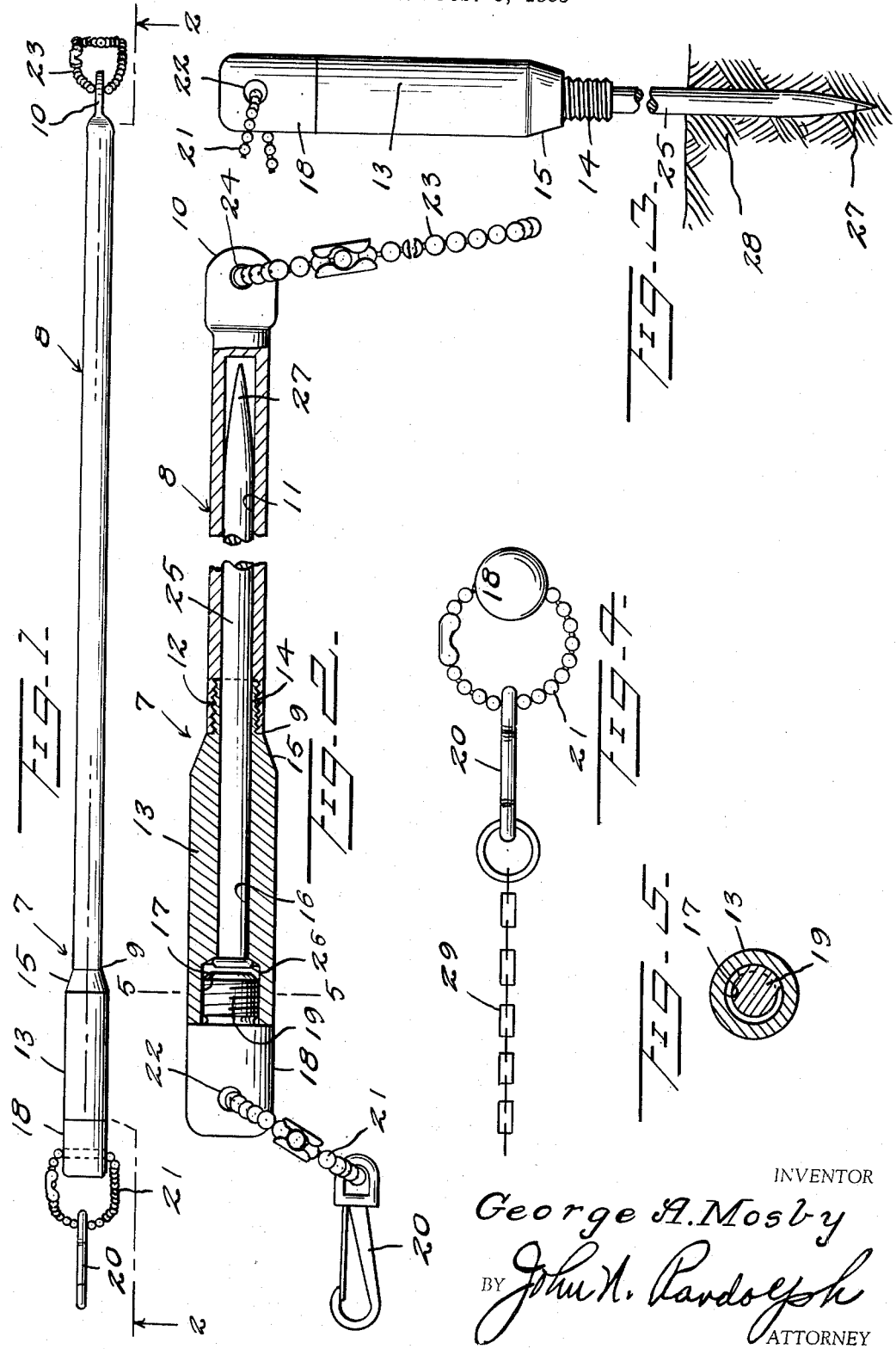
INVENTOR
George A. Mosby
BY John H. Randolph
ATTORNEY

United States Patent Office 2,714,873
Patented Aug. 9, 1955

2,714,873

COMBINATION LEASH AND PICKET STAKE DOG TRAINING DEVICE

George A. Mosby, Highland Park, N. J.

Application February 6, 1953, Serial No. 335,418

5 Claims. (Cl. 119—109)

This invention relates to a novel device for use in training a dog through the use of which positive control may be maintained over a dog and the dog prevented from wandering away from the correct heeling position.

Another object of the invention is to provide a rigid training member which may be effectively utilized for giving direction signals to a dog when not leashed and which may also be employed as a disciplinary switch.

A further and particularly important object of the invention is to provide a training device which may also be employed as an anchoring stake for tethering a dog to restrict its movement to an area of a particular radius or diameter and which is so constructed that a flexible tethering member attached thereto cannot become wound on the device when thus employed.

Other objects and advantages of the invention will hereinafter become more fully apparent from the following description of the drawing, illustrating a presently preferred embodiment thereof, and wherein:

Figure 1 is a plan view of the fully assembled training device;

Figure 2 is an enlarged fragmentary longitudinal sectional view partly in elevation, taken substantially along a plane as indicated by the line 2—2 of Figure 1;

Figure 3 is a fragmentary side elevational view showing the device in position for use as a tethering stake;

Figure 4 is a top plan view of the device as shown in Figure 3 illustrating a tethering member attached to the device, and Figure 5 is a cross sectional view through a portion of the device taken substantially along a plane as indicated by the line 5—5 of Figure 2.

Referring more specifically to the drawing, the training device in its entirety is designated generally 7 and includes an elongated substantially straight staff 8 which is hollow or tubular from an inner end 9 thereof to adjacent an opposite flat end 10 of said staff 8. Accordingly, the staff 8 is provided with a bore or recess extending from adjacent the flat end 10 and which opens outwardly of the end 9. Said bore or recess 11 is enlarged and internally threaded as seen at 12 at its open end. The training device 7 also includes a substantially shorter straight handle 13 which is substantially larger in cross section externally than the staff 8 except at an inner end thereof which is substantially reduced in cross sectional size and externally threaded to provide a nipple 14 which is sized to threadedly fit into the threaded bore portion 12 for detachably connecting the staff and handle. The handle 13 is also provided with a tapered portion extending toward the nipple 14 and which tapered portion 15 at its restricted end is of substantially the same external diameter as the external diameter of the staff end 9 which joins with the restricted end of the tapered handle portion 15. The handle 13 has a bore 16 extending longitudinally therethrough which is enlarged and internally threaded at the end 17 thereof which is disposed remote to the nipple 14. The remainder of the bore 16 is of the same diameter as the bore or recess 11.

A cap 18 is provided with a restricted threaded extension 19 at one end thereof which threadedly engages in the bore portion 17 to attach the cap to and against the outer end of the handle 13. The remainder of the cap is of the same cross sectional size and shape externally as the handle 13.

The parts 8, 13 and 18 are preferably formed of a lightweight rust resistant metal such as aluminum but as the description proceeds it will become apparent that said parts may be formed of other inexpensive lightweight materials which are rust resistant, such as certain plastics.

A conventional snap hook 20 is detachably connected to the cap 18 by a conventional ball chain loop 21 which extends loosely through a transverse bore 22 of the cap 18. A larger or longer ball chain loop 23 is attached to the opposite end of the training device 7 by detachably engaging through an opening 24 of the staff end 10.

The staff 8 and handle 13 combine to form a sheath for a tethering stake 25 which extends substantially the length thereof and which fits relatively snug but slidably and turnably in said bores 11 and 16. An enlarged end or head 26 of the stake 25 turnably fits in the inner end of the bore portion 17, inwardly of the cap projection 19 and the tapered pointed opposite end 27 of the stake 25 is disposed adjacent the closed end of the staff bore or recess 11. It will be readily obvious that the stake 25 which may be formed of any suitable rigid metal will function to reinforce the handle 13 and particularly the staff 8, thus enabling said parts to be formed of materials such as plastics without danger of the staff 8 breaking.

The fully assembled training device 7, as illustrated in Figures 1 and 2, may be used as a rigid leash or training stick for maintaining a dog in a proper "heeling" position. The loop 23 is of sufficient size to enable it to be slipped over a dog's head after which the handle and staff may be twisted about the longitudinal axis of the training device to tighten the loop 23 about the neck. If preferred, the snap hook 20 can be attached to the dog's collar. The training device may also be used as a disciplinary switch when not attached to a dog and when not in use the snap hook 20 may be attached to the user's belt loop and suspended thereby along one side of the body to leave both hands free or said device may be so attached to a belt loop and while the tightened ball chain loop 23 is engaged about the dog's neck, for leaving both hands free. The training device 7 may also be used for giving direction signals to a dog when the dog is not attached to either end thereof.

By unscrewing the staff 8 from the handle nipple 14, the portion of the stake 25 normally enclosed by the staff 8 is exposed and may be driven into the ground 28 as illustrated in Figure 3 and be maintained in an upright position. One end of a flexible tethering member 29, such as a chain, rope or leash, may then be connected to the snap hook 20 and the other end of said tethering member, not shown, attached to the collar of a dog. With the staff 8 removed the handle 13 and cap 18 are free to swivel on the anchored stake 25 to prevent the tethering member from being wound around the stake and handle by movement of the dog. Obviously, any part of the tethering member 29, particularly if it is chain, may be attached to the snap hook 20 for varying the size or radius of the area in which the tethered dog has freedom of movement.

Various modifications and changes are contemplated and may obviously be resorted to, without departing from the spirit or scope of the invention as hereinafter defined by the appended claims.

I claim as my invention:

1. A device of the character described comprising an elongated tethering stake having a first end portion adapted to be driven into the ground and a second end portion terminating in a head, an elongated handle having an inner end and an outer end and provided with a longitudinally extending bore opening outwardly of the inner end and a bore portion of larger diameter communicating with the inner end of said bore and opening outwardly of the outer end of the handle, said second end portion of the stake being turnably disposed in the handle bore and said head portion being turnably disposed in said enlarged bore portion, said first end portion of the stake extending from the inner end of the handle, a cap connected to the outer end of the handle and closing the outer end of said enlarged bore portion for swively retaining the handle on the stake, and means adapted to detachably connect an end of a tethering member to said cap.

2. A device as in claim 1, a hollow sheath having a closed outer end and an open inner end for receiving and enclosing the first end portion of the stake, means detachably connecting the inner ends of the sheath and handle to form an elongated rigid leash, and a flexible neck engaging loop member connected to the closed end of said sheath and adapted to engage around the neck of a dog.

3. A device as in claim 2, said flexible loop member comprising a ball chain and a connector element detachably connecting end portions of the chain, and said closed end of the sheath having an opening through which a part of said chain loosely extends.

4. A device of the character described comprising an elongated handle having a bore extending longitudinally therethrough including an enlarged threaded end, a stake loosely disposed in said bore and having a head at one end thereof turnably disposed in the enlarged bore end and of a size to prevent passage of the head through the other portion of the bore, said stake having an end portion projecting from the handle end disposed remote from the enlarged bore end, a cap having a threaded end engaging the threaded bore end for retaining the stake head therein and for swively mounting the handle and cap on the stake to provide a tethering device when the other projecting end of the stake is driven into the ground, and means connected to the other exposed end of the cap and adapted to connect the cap to an end of an elongated tethering member.

5. A device as in claim 4, the handle end disposed remote from the cap terminating in an externally threaded nipple, an elongated hollow sheath detachably disposed over the projecting stake end and having a closed end disposed beyond the stake and an internally threaded open end engaging said nipple for detachably connecting the sheath and handle to provide a rigid leash or training stick in which the stake is contained, and a flexible loop member connected to said closed sheath end and adapted to engage around the neck of a dog.

References Cited in the file of this patent

UNITED STATES PATENTS

| 217,004 | Elmer | July 1, 1879 |
| 2,322,897 | Van Den Bogaerde, Jr. | June 29, 1943 |
| 2,337,970 | Cassell | Dec. 28, 1943 |

FOREIGN PATENTS

| 3,949 | Great Britain | 1912 |
| 503,652 | Germany | July 30, 1930 |
| 427,920 | Great Britain | May 2, 1935 |